US010850840B2

(12) United States Patent
Schwartz et al.

(10) Patent No.: US 10,850,840 B2
(45) Date of Patent: Dec. 1, 2020

(54) DRONE AND ROVER PREPLACEMENT FOR REMOTE AUTONOMOUS INSPECTION OF UTILITY SYSTEM COMPONENTS

(71) Applicant: Florida Power & Light Company, Juno Beach, FL (US)

(72) Inventors: Eric D. Schwartz, Juno Beach, FL (US); Stephen S. Cross, North Palm Beach, FL (US); Bryan M. Kitchener, Boynton Beach, FL (US)

(73) Assignee: Florida Power & Light Company, Juno Beach, FL (US)

( * ) Notice: Subject to any disclaimer, the term of this patent is extended or adjusted under 35 U.S.C. 154(b) by 287 days.

(21) Appl. No.: 16/008,410

(22) Filed: Jun. 14, 2018

(65) Prior Publication Data

US 2019/0382111 A1 Dec. 19, 2019

(51) Int. Cl.
*B64C 39/02* (2006.01)
*H02G 1/02* (2006.01)

(52) U.S. Cl.
CPC ............ *B64C 39/024* (2013.01); *H02G 1/02* (2013.01); *B64C 2201/126* (2013.01); *B64C 2201/141* (2013.01)

(58) Field of Classification Search
CPC . B64C 39/024; B64C 39/2201; B64C 39/126; B64C 39/141; B64C 2201/126; B64C 2201/141; H02G 1/02
USPC ............................................................ 701/3
See application file for complete search history.

(56) References Cited

U.S. PATENT DOCUMENTS

| 8,511,606 | B1 | 8/2013 | Lutke et al. |
| 8,880,241 | B2 | 11/2014 | Mohamadi |
| 9,439,092 | B1 | 9/2016 | Chukka et al. |
| 9,440,545 | B2 | 9/2016 | Wang |
| 9,489,852 | B1 | 11/2016 | Chambers et al. |
| 9,578,465 | B2 | 2/2017 | Da Silva Neto et al. |
| 9,678,507 | B1 | 6/2017 | Douglas et al. |
| 9,738,381 | B1 | 8/2017 | Loud et al. |
| 9,766,122 | B2 | 9/2017 | Cothuru et al. |

(Continued)

FOREIGN PATENT DOCUMENTS

| CN | 105350464 | 2/2016 |
| WO | 2015135523 A1 | 9/2015 |

(Continued)

OTHER PUBLICATIONS

Anderson, Michael L., et al., "The sticky-pad plane and other innovative concepts for perching UAVs", 47th AIAA Aerospace Sciences Meeting Including The New Horizons Forum and Aerospace Exposition, 2009.

(Continued)

*Primary Examiner* — Yazan A Soofi
(74) *Attorney, Agent, or Firm* — Thomas Grzesik; Fleit Intellectual Property Law

(57) ABSTRACT

Unmanned monitoring devices, such as unmanned aerial vehicles (UAV), drones or rovers may survey an area of interest (AOI) such an electric power distribution system including generation, transmission, and distribution elements to automatically determine components in the AOI to be monitored. Types, placements locations, and pathways taken by other unmanned monitoring devices to facilitate the monitoring of the components of the AOI are also automatically determined.

20 Claims, 10 Drawing Sheets

(56) References Cited

U.S. PATENT DOCUMENTS

| | | |
|---|---|---|
| 9,773,419 B1 | 9/2017 | Gordon et al. |
| 9,840,380 B2 | 12/2017 | Saad et al. |
| 9,845,020 B2 | 12/2017 | Streett |
| 9,845,165 B2 | 12/2017 | Michalski et al. |
| 9,930,537 B2 | 3/2018 | Ljung et al. |
| 10,168,695 B2* | 1/2019 | Barnickel .......... H04B 7/18506 |
| 10,340,983 B2* | 7/2019 | Liu .......................... H04B 3/58 |
| 2016/0144959 A1 | 5/2016 | Meffert |
| 2016/0185466 A1 | 6/2016 | Dreano, Jr. |
| 2016/0191142 A1* | 6/2016 | Boss ................. H04W 28/0289 |
| | | 455/405 |
| 2016/0269917 A1* | 9/2016 | Hillegas, Jr. .......... H04W 24/02 |
| 2016/0270148 A1 | 9/2016 | Filipovic et al. |
| 2017/0032686 A1 | 2/2017 | Alonso Tabares et al. |
| 2017/0073084 A1 | 3/2017 | Mozer |
| 2017/0192418 A1* | 7/2017 | Bethke ................. G08G 5/0013 |
| 2018/0003161 A1* | 1/2018 | Michini .................. F03D 17/00 |
| 2018/0093769 A1* | 4/2018 | Sequeira ............. G01S 13/0209 |
| 2018/0095460 A1 | 4/2018 | Chen et al. |
| 2018/0130196 A1* | 5/2018 | Loveland ............. G06K 9/4604 |
| 2019/0112048 A1* | 4/2019 | Culver .................. B64C 39/024 |
| 2019/0144112 A1* | 5/2019 | Jaugilas .................. H02J 7/025 |
| | | 244/75.1 |
| 2019/0333292 A1* | 10/2019 | Chan ........................ B60L 3/12 |

FOREIGN PATENT DOCUMENTS

| | | |
|---|---|---|
| WO | 2016175648 A1 | 11/2016 |
| WO | 2017109780 A1 | 6/2017 |

OTHER PUBLICATIONS

Moore, Andrew J., et al., "Autonomous Inspection of Electrical Transmission Structures with Airborne UV Sensors—NASA Report on Dominion Virginia Power Flights of Nov. 2016," May 1, 2017.

Gharibi, M. et al., "Internet of Drones", Access IEEE, vol. 4, pp. 1148-1162, 2016.

Caillouet, C. et al., "Efficient Deployment of Connected Unmanned Aerial Vehicles for Optimal Target Coverage," IEEE. GIIS 2017—Global Information Infrastructure and Networking Symposium, Oct. 2017, Saint-Pierre, France.

Altshuler Y. et al., Optimal Dynamic Coverage Infrastructure for Large-Scale Fleets of Reconnaissance UAVs, Swarms and Network Intelligence in Search. Studies in Computational Intelligence, vol. 729. Springer, Cham, 2018, pp. 207-238.

* cited by examiner

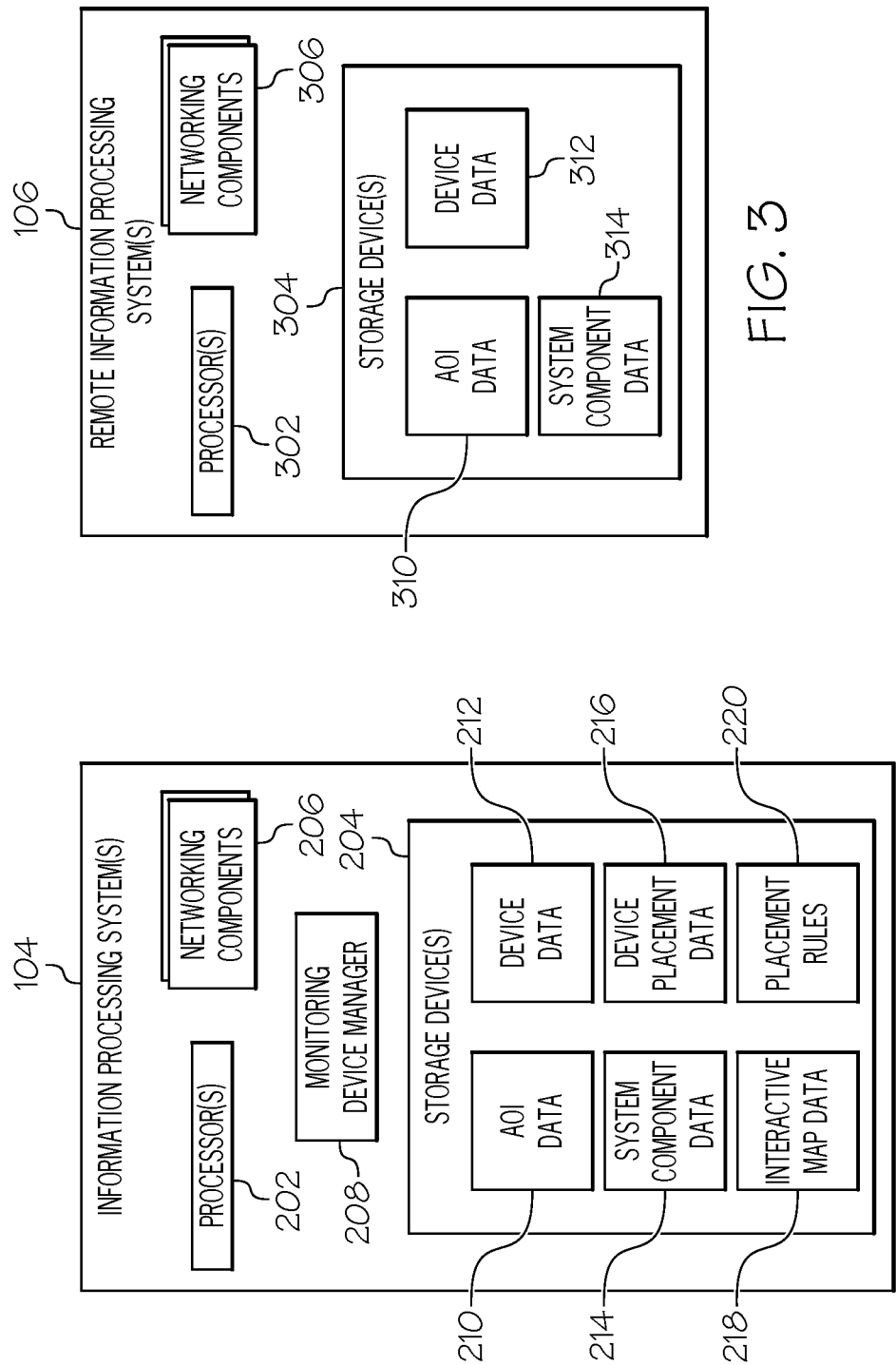

FIG. 5

| AOI ID 508 | LOCATION 510 | SIZE 512 | TERRAIN TYPE 514 | ELEVATION 516 | FEATURES 518 | HISTORICAL WEATHER 520 | ... |
|---|---|---|---|---|---|---|---|
| AOI_A 522 | LOC_A | SIZE_A 526 | TER_A | ELV_A 530 | FTRS_A | WTHR_A 534 | ... |
| AOI_B | LOC_B 524 | SIZE_A | TER_B 528 | ELV_B | FTRS_B 532 | WTHR_B | ... |
| ... | ... | ... | ... | ... | ... | ... | ... |
| AOI_N | LOC_N | SIZE_N | TER_N | ELV_N | FTRS_N | WTHR_N | ... |

FIG. 6

| DEVICE ID 608 | DEVICE TYPE 610 | SENSOR/ FEATURES 612 | POWER SOURCES 614 | COMM 616 | PROTECTION 618 | MOBILITY 620 | OP FEATURES 622 | OP TIME 624 | OP COSTS 626 | ... |
|---|---|---|---|---|---|---|---|---|---|---|
| DEV_1 628 | TYPE_A | FTRS_A 632 | PWR_A | COM_A 636 | PROT_A | MOB_A 640 | OP_A | TM_A 644 | CST_A | ... |
| DEV_B | TYPE_B 630 | FTRS_B | PWR_B 634 | COM_B | PROT_B 638 | MOB_B | OP_B 642 | TM_B | CST_B 646 | ... |
| ... | ... | ... | ... | ... | ... | ... | ... | ... | ... | ... |
| DEV_N | TYPE_N | FTRS_N | PWR_N | COM_N | PROT_N | MOB_N | OP_N | TM_N | CST_N | ... |

| COMPONENT ID | AOI | PART NUMBER | LOCATION | FUNCTION | |
|---|---|---|---|---|---|
| CID_1 718 | AOI_A 720 | PRT_A 722 | LOC_1 | FNC_A 726 | ⋮ |
| CID_2 | AOI_A 720 | PRT_B | LOC_2 724 | FNC_B | ⋮ |
| ⋮ | ⋮ | ⋮ | ⋮ | ⋮ | ⋮ |
| CID_N | AOI_Y | PRT_N | LOC_N | FNC_N | ⋮ |

FIG. 7

| DEVICE ID | AOI | COMP ID | LOCATION | ... |
|---|---|---|---|---|
| DEV_1 *816* | AOI_1 | CID_1 *820* | LOC_A | ... |
| DEV_2 | AOI_1 *818* | CID_2 | LOC_B *822* | ... |
| ... | ... | ... | ... | ... |
| DEV_N | AOI_1 | CID_N | LOC_Z | ... |

DRONE AND ROVER PREPLACEMENT FOR REMOTE AUTONOMOUS INSPECTION OF UTILITY SYSTEM COMPONENTS

FIELD OF THE DISCLOSURE

The present invention generally relates to utility systems, and more particularly to monitoring and inspecting utility system components.

BACKGROUND

The North American power grid has been characterized by the Smithsonian Institution as the largest machine ever built by mankind. The size, geographic diversity, environmental diversity, and the multitude of components that comprise the power grid presents unique challenges in the rapid and efficient upgrading the system with diverse new technologies that realize America's objective of improved power grid reliability and hardening. Accordingly, utility systems are an integral part of modern day life. Unfortunately, components of these systems may become inoperable. For example, consider an electrical power substation that is part of a power grid. Substations perform various functions such as transforming voltage, connecting two or more transmissions lines, transferring power, and protecting the grid from short circuits and overload currents. In many instances substation equipment is susceptible to damage, which may result in power outages throughout the grid. Power outages decrease customer satisfaction and damaged substation equipment increases costs incurred by the utility provider.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 is a block diagram illustrating a more detailed example of an information processing system for autonomous management of monitoring/inspection devices within areas of interest according to one embodiment of the present invention;

FIG. 3 is a block diagram illustrating a more detailed example of a remote information processing system according to one embodiment of the present invention;

FIG. 5 shows one example of area of interest data according to one embodiment of the present invention;

FIG. 6 shows one example of monitoring device data according to one embodiment of the present invention;

FIG. 7 shows one example of system component data according to one embodiment of the present invention;

FIG. 8 shows one example of placement data according to one embodiment of the present invention;

DETAILED DESCRIPTION

Figure 1:
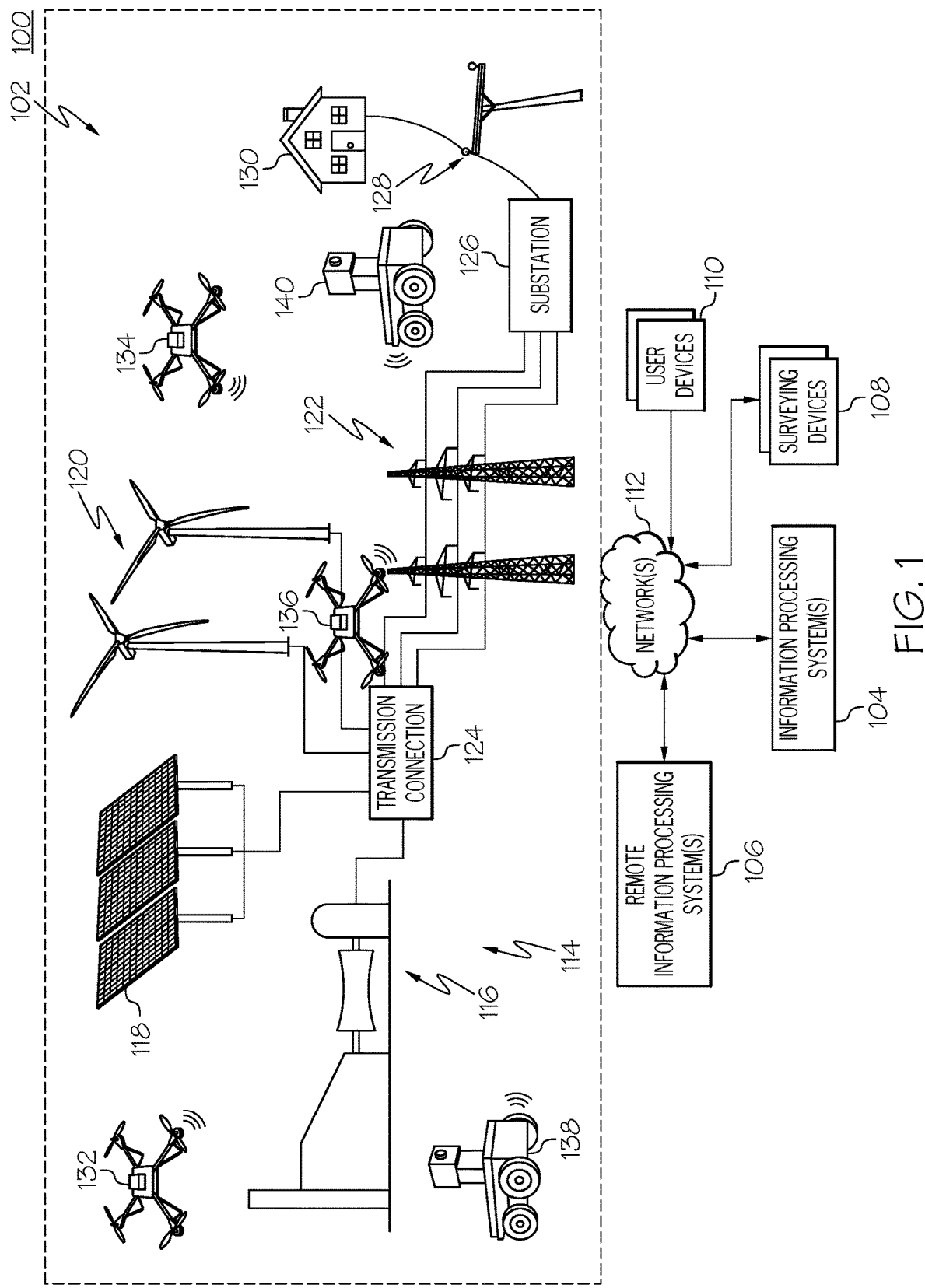
FIG. 1 is an illustrative example of a system for autonomous management of monitoring/inspection devices within areas of interest according to one embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide for the autonomous management of monitoring/inspection devices within areas of interest (AOIs) and facilitates the rapid preplacement and deployment of diverse new autonomous monitoring devices for the power grid, thereby facilitating the more rapid improvement in the reliability of the largest machine made by mankind. In some embodiments, AOIs are geographical areas comprising utility system components. However, embodiments of the present invention are not limited to utility systems. The geographical areas where utility system components are disposed and the scale of these components may vary greatly. For example, a first substation may be located in a relatively flat geographical area with main road access to the substation, whereas a second substation may be located in a mountainous geographical area with only trail or backroad access to the substation. In addition, the scale of the first substation may be much larger than the scale of the second substation. Therefore, the type, number, and location of monitoring devices to be implemented at the first substation may differ than the type, number, and location of monitoring devices to be implemented at the second substation.

Furthermore, components of a utility system may become damaged or inoperable. Depending on the geographical location of the damaged components; current weather conditions; types of damage or operational issues; and/or the like it may be difficult to detect, locate, and remedy the issues within an acceptable amount of time. This may result in increased downtime of the system component(s), which decreases customer satisfaction and increases costs incurred by the utility provider.

Conventional utility system monitoring/inspection mechanisms generally involve dispatching work crews to identify the damaged component(s), the extent of damage, cause of damage, etc. These conventional mechanisms are problematic because they increase the downtime of the system component, outages experienced by the customer, expenses incurred by the utility provider, etc. For example, it takes times for a crew to reach a site to assess damage, identify inoperable components, and receive repair components. In addition, the work crew may need to operate in dangerous environmental conditions to identify and repair the problematic components.

Embodiments of the present invention overcome the above problems by implementing an autonomous system across one or more information processing systems. The system utilizes AOI data, monitoring device data, and system component data to determine a set of monitoring/inspection devices and locations within a given AOI(s) at which the set of monitoring/inspection devices are to be disposed. As will be discussed in greater detail below, the system determines an AOI comprising at least one component to be monitored. A first set of attributes for the area of interest, and a second set of attributes for each monitoring device of a plurality of monitoring devices are determined by the system. A third set of attributes for the at least one component may also be determined. The system then determines a set of monitoring devices from the plurality of monitoring devices to monitor the at least one component, and a location within the area of interest to implement each monitoring device of the set of monitoring devices are determined based on one or more of the first, second, and third sets of attributes.

The system also generates, utilizing at least a first mobile unmanned monitoring device, survey data of an area of interest comprising at least one system component to be monitored by one or more mobile unmanned monitoring devices. The system automatically identifies the system component of interest from the survey data and determines a first set of attributes for the area of interest based on the survey data. The system selects at least a second mobile unmanned monitoring device from a plurality of mobile unmanned monitoring devices to monitor the at least one component based on at least the first set of attributes a second set of attributes for each mobile unmanned monitoring device of the plurality of mobile unmanned monitoring devices. The system also selects a placement location within the area of interest to implement the at least second mobile unmanned monitoring device based on at least the first set of attributes and the second set of attributes associated with the at least second mobile unmanned monitoring device. The system further determines a travel path within the area of interest for the at least second mobile unmanned monitoring device based on at least the first set of attributes and the second set of attributes associated with the at least second mobile unmanned monitoring device.

The system may further utilize the AOI data, monitoring device data, and system component data to configure and/or operate the monitoring/inspecting. The operations performed by the autonomous system allow for a more efficient determination and placement of the monitoring device sets. In addition, placing autonomous monitoring/inspection devices at locations where utility systems components can be autonomously monitored/inspected enables real-time or near real-time autonomous detection and identification of problems experienced by the system components. This allows for system/component down time, customer dissatisfaction, and utility provide expenses to be greatly decreased since work crews do not need to be dispatched to diagnose the problem. Because the problem (and cause) experienced by the system component has already been detected and identified, the work crews can be dispatched with the proper personnel, tools, equipment, and repair procedures.

FIG. 1 shows one example of an operating environment 100 for automatically managing preplacement of autonomous monitoring and/or inspection devices within areas of interest (AOIs) comprising utility system components. In one embodiment, the operating environment 100 may comprise one or more AOIs 102, information processing systems 104, remote information processing systems 106, surveying devices/vehicles 108, user devices 110, networks 112, and/or the like.

The AOI(s) 102 may be a defined geographical area comprising one or more geographical features and components of a utility system situated at various locations within the AOI 102. Examples of geographical features includes rivers, streams, hills, cliffs, mountains, trees, boulders, and/or the like. Examples of utility systems include power grid systems (e.g., fossil fuel based, solar-based, wind-based, nuclear-based generation, transmission and/or distribution subsystems), telephone systems (landline and wireless), water systems, gas systems, and oil systems. Each of these different types of utility systems may have multiple types of subsystems. For example, an electric power delivery system generally comprises a generation subsystem, a transmission subsystem, and a distribution subsystem. Each of these of these subsystems performs one or more specific functions and comprise multiple components. For example, the distribution subsystem of an electric power system comprises substations where each substation performs various functions for a power grid such as transforming voltage, connecting transmissions lines, transferring power, and protecting the grid from short circuits and overload currents, and/or the like. Components of a substation include, but are not limited to, incoming and outgoing power lines, transformers, disconnect switches, circuit breakers, arresters, etc. Other non-limiting examples of utility system components include substations, transformers, utility poles, transmissions lines, solar panels, cooling towers, pipelines, and/or the like.

In the example shown in FIG. 1, the AOIs 102 includes an electrical power "grid" that is used to provide electrical power to consumer premises 130. Area 102 may contain a multitude of individual or overlapping AOIs. The example shown in FIG. 1 depicts a number of example power generation components 114. Illustrated are a combined cycle gas generator 116, a solar array farm 118, and a wind farm 120 AOIs. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In this example, electrical power generated by one or more power generation components is provided to a power transmission system 122. The illustrated example depicts a transmission connection 124 that couples one or more sources within power generation components 114 to the power transmission system 122. The transmission connection 124 and power transmission system 122 AOIs in an example include suitable step-up transformers and long distance transmission lines to convey the generated electrical power to remote power distribution networks, other electrical power consumers, or both.

The illustrated power transmission system 122 provides electrical power to one or more distribution systems including a substation 126, distribution lines 128 and premises 130. The substation 126 AOI may include transformers, protection devices, and other components to provide electrical power to a power distribution lines 128. The power distribution lines 128 delivers power produced by the generating components 114 to customer premises, such as the illustrated home 130. In general customer premises are coupled to the power distribution system 128 and are able to include any combination of residential, commercial or industrial buildings. FIG. 1 further shows one or more monitoring/inspection devices 132 to 140 placed at one or more locations within the AOIs 102. As will be discussed in greater detail below, the monitoring/inspection devices 132 to 140 are configured to remotely and autonomously inspect utility system components.

Referring now to FIG. 2, the information processing system(s) 104 may include one or more processors 202 (FIG. 2), one or more storage devices 204, networking/communication components 206, a monitoring device manager 208, AOI data 210, monitoring device data 212, utility system component data 214, device placement data 216, and interactive map data 218. It should be noted that although FIG. 2 shows the various types of data 210 to 220 residing within the storage device(s) 204, one or more of these datasets may reside outside of the storage device(s) 204. It should also be noted that one or more of the information processing system components may be distributed across multiple information processing systems.

The monitoring device manager 208, in one embodiment, obtains data associated with an AOI that comprises utility system components to be monitored and/or inspected by devices 132 to 140. In one embodiment, the one or more monitoring/inspection devices 132 to 140 are placed at specific locations within the AOI 102. The monitoring/inspection devices 132 to 140, in one embodiment, may be unmanned mobile monitoring devices such as (but are not limited to) unmanned aerial vehicles (UAVs), drones, rovers, climbing robots, and/or the like having monitoring systems such as optical cameras, infrared sensors, LIDAR, RADAR, acoustic systems, and/or the like.

The monitoring device manager 208 further obtains data associated with the monitoring/inspection devices and the utility systems components within an AOI 102. The manager 208 utilizes the obtained data to determine a set of devices for monitoring/inspecting the utility systems components; determine locations within the area of interest to deploy the monitoring/inspection devices 132 to 140 which may be one or more of a plurality of a mobile unmanned monitoring devices such as a rover, a UAV, and/or the like that are available for use in the AOI 102; and configure and/or operate the monitoring/inspecting. It should be noted that the placement operations discussed herein are not limited to monitoring/inspecting devices 132 to 140. For example, these operations are also applicable to determining a set of recharging/refueling docking systems; weather protection enclosures such as a rover garages or UAV hangers; and/or the like to be placed within the AOI as well.

The monitoring device manager 208 is discussed in greater detail below. The remote information processing system(s) 104 may include one or more processors 302 (FIG. 3), one or more storage devices 304, networking/communication components 306, AOI data 310, monitoring device data 312, and utility system component data 314.

Referring back to FIG. 1, the network(s) 112 may comprise wireless communication networks, non-cellular networks such as Wireless Fidelity (WiFi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks include one or more networks based on such standards. For example, in one embodiment, a wireless communication network may comprise one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

The surveying devices 108 in one embodiment, may be one or more of a plurality of mobile unmanned rover monitoring devices such as a rover, a UAV, and/or the like that are available for use in the AOI 102. The surveying devices 108 may comprise one or more sensors such as a Global Positioning System (GPS), an altimeter, a barometer, an imaging system including one or more cameras (e.g., still, video, infrared, etc.), and/or the like. The surveying devices 108 utilizes these components to obtain AOI data such as geographical feature data, geographic size data, elevation data, and/or the like. The user devices 110, in one embodiment, comprises air-interface cards or chips, two-way radios, cellular telephones, mobile phones, smart phones, two-way pagers, wireless messaging devices, wearable computing devices, laptop computers, tablet computers, desktop computers, personal digital assistants, a combination of these devices, and/or other similar devices.

The AOI(s) 102 may be a defined geographical area comprising one or more geographical features and components of a utility system situated at various locations within the AOI 102. Examples of geographical features includes fields, farms, sites, lots, rivers, streams, hills, cliffs, mountains, trees, boulders, and/or the like. Examples of utility systems include power systems (e.g., fossil fuel based, solar-based, wind-based, nuclear-based, etc.), telephone systems (landline and wireless), water systems, gas systems, and oil systems. Each of these different types of utility systems may have multiple types of subsystems. For example, an electric power delivery system generally comprises a generation subsystem, a transmission subsystem, and a distribution subsystem. Each of these of these subsystems performs one or more specific functions and comprise multiple components. For example, the distribution subsystem of an electric power system comprises substations where each substation performs various functions for a power grid such as transforming voltage, connecting transmissions lines, transferring power, and protecting the grid from short circuits and overload currents, and/or the like. Components of a substation include, but are not limited to, incoming and outgoing power lines, transformers, disconnect switches, circuit breakers, arresters, etc. Other non-limiting examples of utility system components include substations, transformers, utility poles, transmissions lines, solar panels, cooling towers, pipelines, and/or the like.

In the example shown in FIG. 1, the AOIs 102 includes an electrical power "grid" that is used to provide electrical power to consumer premises 130. The example shown in FIG. 1 depicts a number of example power generation components 114. Illustrated are a combined cycle gas generator 116, a solar array farm 118, and a wind farm 120. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In this example, electrical power generated by one or more power generation components is provided to a power transmission system 122. The illustrated example depicts a transmission connection 124 that couples one or more sources within power generation components 114 to the power transmission system 122. The transmission connection 124 and power transmission system 122 in an example include suitable step-up transformers and long distance transmission lines to convey the generated electrical power to remote power distribution networks, other electrical power consumers, or both.

The illustrated power transmission system 122 provides electrical power to a substation 126. The substation 126 may include transformers, protection devices, and other components to provide electrical power to a power distribution system 128. The power distribution system 128 delivers power produced by the generating components 114 to customer premises, such as the illustrated home 130. In general customer premises are coupled to the power distribution system 128 and are able to include any combination of residential, commercial or industrial buildings.

Figure 4:
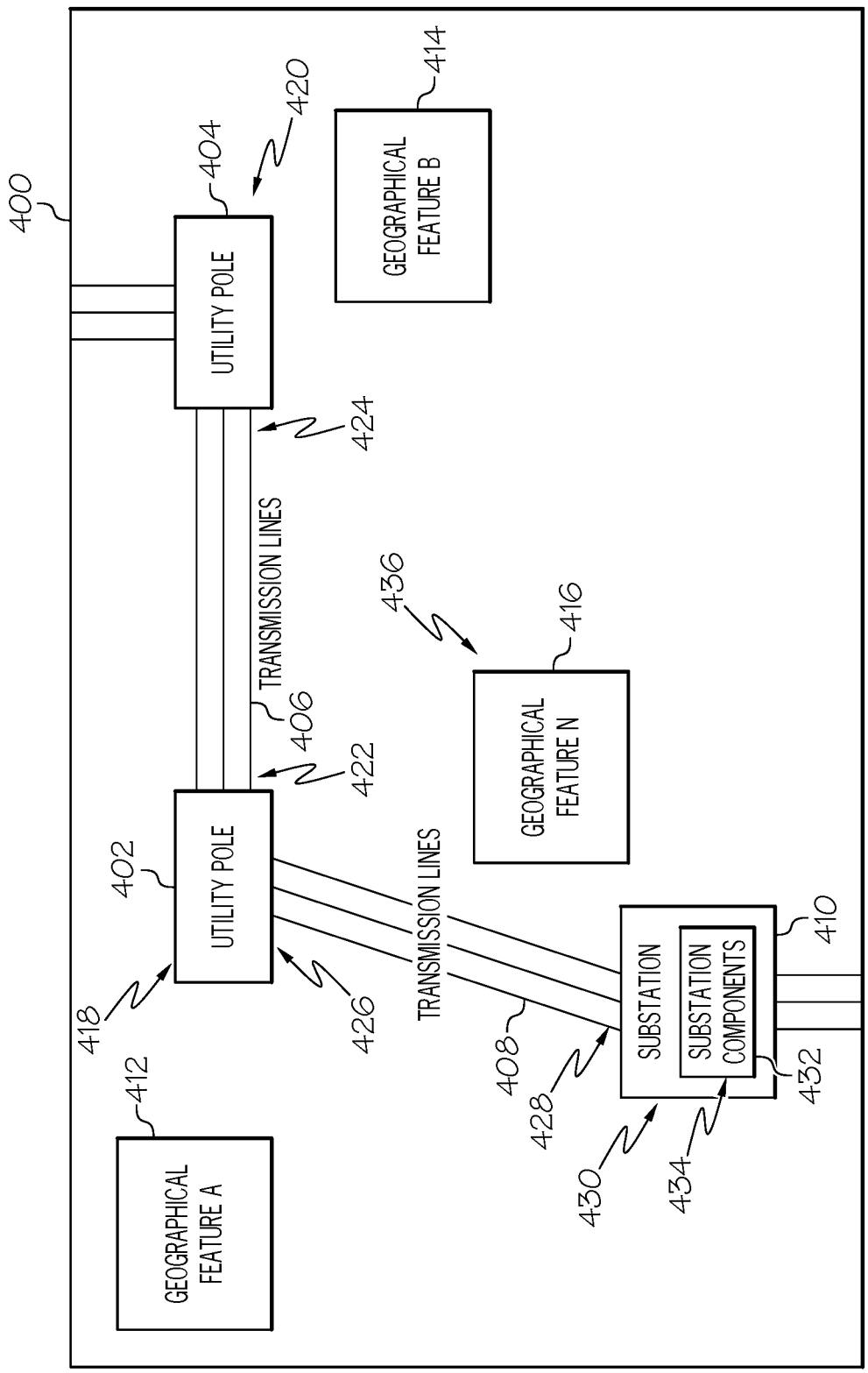
FIG. 4 is an illustrative example of an area of interest according to one embodiment of the present invention.

FIG. 4 shows one example of AOI(s) 400, which may contain multiple independent or overlapping AOIs prior to monitoring devices being placed therein according to one or more embodiments of the present invention. In the example shown in FIG. 4, the AOI 400 is a geographical area comprising electric power system components such as a utility poles 402, 404; transmissions lines 406, 408; and a substation 410. Each of these items may be comprised of multiple components. For example, a utility pole 402 may include a transformer, fuse cutout, breaker, relay, surge arrestors, etc. A substation 410, which on some examples may be an independent AOI, may include overhead lines, surge arrestors, transformers, etc. It should be noted that although the example in FIG. 4 is directed to electric power system components, embodiments of the present invention are not limited to such examples and are applicable to any type of utility system and components. It should also be note that embodiments of the present invention are not limited to utility systems. FIG. 4 further shows that the AOI 400 comprises one or more geographical features 412, 414, 416. Examples of geographical features include (but are not limited to) rivers, streams, hills, cliffs, mountains, trees, boulders, and/or the like.

In most instances it is important that components of utility systems remain operational and experience minimal downtime. Therefore, the monitoring device manager 208 utilizes area of interest data 210, 310; monitoring device data 212, 312; and system component data 214, 314 to identify a set of monitoring/inspection devices 132 to 140 to automatically monitor and/or inspect utility system components within an AOI 102, and to further determine locations within the AOI 102 to position the monitoring/inspection devices 132 to 140. The monitoring device manager 208 may also program and/or control the one or more monitoring devices 132 to 140 to monitor/inspect specific components of the utility system for detecting and identifying damage and operational problems. For example, the monitoring devices 132 to 140 may autonomously detect when a transformer at a substation has been damaged and notify the monitoring device manager 208 (and/or one or more other information processing systems). The monitoring device manager 208 may then perform one or more autonomous operations to rectify the issue or problem detected by the monitoring device(s) 132 to 140. In another embodiment, the monitoring devices 132 to 140 autonomously monitor specific components of the utility system and communicate their monitored data to the monitoring device manager 208 and/or one or more other information processing systems, which analyze the data to detect any problems or issues associated with the monitored component.

As discussed above, the geographical areas at which components of utility systems are disposed and the scale of these components may vary greatly. For example, a first substation may be located in a relatively flat geographical area with main road access to the substation, whereas a second substation may be located in a mountainous geographical area with only trail or backroad access to the substation. In addition, the scale of the first substation may be much larger than the scale of the second substation. Therefore, the type, number, and location of monitoring devices 132 to 140 to be implemented at the first substation may differ than the type, number, and location of monitoring devices 132 to 140 to be implemented at the second substation. Accordingly, the monitoring device manager 208 utilizes the AOI data 210, 310; and monitoring device data 212, 312; and system component data 214, 314 to determine a set of monitoring/inspection devices 132 to 140 and locations within an AOI 102 at which the set of monitoring/inspection devices are to be disposed.

AOI data 210, 310 comprises data such as (but not limited to) geographical type of the AOI, geographical features within the AOI, geographical size or boundaries of the AOI, elevation of the AOI, historical weather of the AOI, local and/or migratory wildlife data for the AOI, and/or the like. The monitoring device manager 208 may obtain AOI data 210 for a given AOI in different ways. For example, the monitoring device manager 208 may utilize one or more of the networking components 206 to establish a communication link with the remote information processing system(s) 104 via the network 112, where the communication link may be secure or unsecure. In this example, the remote information processing system 106 stores AOI data 310 for one or more utility systems. Upon establishing the communication link, the monitoring device manager 208 may download the AOI data 310 stored at the remote information processing system 106 and store this data as local AOI data 210 in one or more storage devices 204. In other embodiments, the monitoring device manager 208 does not download the remotely stored AOI data 310, but accesses and processes this data 310 directly on remote information processing system 106. Alternatively, the remote information processing system 106 may push its AOI data 310 to the device manager 208 at one or more predefined intervals and/or upon new AOI data 310 being obtained by the remote information processing system 106.

In some embodiments, the AOI data 310 obtained from the remote information processing system 106 comprises data for all AOIs associated with one or more entities (e.g., utility providers) utilizing the device manager 208. In other embodiments, the device manager 208 obtains the remote AOI data 310 on an as needed basis. For example, when the device manager 208 determines an AOI 102 requires placement and management of monitoring/inspection devices the manager 208 only obtains AOI data for the specific AOI 102 (and possibly related AOIs as well).

In addition to (or in lieu of) obtaining AOI data 310 from the remote information processing system 106, the device manager 208 may obtain AOI data 210 from one or more surveying devices 108. For example, upon determining that an AOI 102 requires placement and management of monitoring/inspection devices the manager 208 may utilize one or more of the networking components 206 to establish a communication link with a surveying device 108 via the network 112, where the communication link may be secure or unsecure. In one example, the surveying device 108 may be an unmanned rover or a UAV comprising one or more sensors such as a Global Positioning System (GPS), an altimeter, a barometer, an imaging system including one or more cameras (e.g., still, video, infrared, etc.), and/or the like.

The surveying device 108 utilizes these components to obtain AOI data such as geographical feature data, geographic size data, elevation data, and/or the like. Once this data is obtained, the surveying device 108 may transmit this data to the device manager 208 as AOI data 210 over a communication link established with device manager 208 via the network 112. In some embodiments, the AOI data received from the surveying device 108 may comprise photographs and/or videos of the surveyed area. In these embodiments, the device manager 208 is configured to analyze the photographs and/or videos to identify the features/attributes of interest. For example, the device manager 208 may utilize machine learning and feature recognition mechanisms to identify geographical features within photographs/videos, area size, and/or the like.

The device manager 208 may receive the AOI data from the surveying device 108 in real time as the surveying device 108 captures the data and/or at given intervals. In some embodiments, the device manager 208 requests the AOI data from the surveying device 108 in response to receiving a request to perform one or more monitoring device preplacement operations. Alternatively, the surveying device 108 provides AOI data without receiving a request from the device manager 208. In some embodiments, the device manager 208 programs the surveying device 108 with a roving/flight path based on AOI location data (e.g., GPS coordinates) so that the surveying device 108 may autonomously traverse the AOI to obtain AOI data. The device manager 208 may store the AOI data 210 received from the surveying device(s) 106 data locally in one or more storage devices 204.

FIG. 5 shows various examples of AOI data 210. In the example shown in FIG. 5, each row 502, 504, 506 in the table 500 corresponds to AOI data for a given AOI and is referred to herein as an "AOI profile". In this example, each column within the table 500 stores a different type of data. It should be noted that embodiments of the present invention are not limited to the types of data shown in the columns of FIG. 5. Also, one or more of the columns shown in FIG. 5 may be removed and/or additional columns having different types of data may be added. It should also be noted that AOI profiles for different AOIs are not required to be stored in a single table and may be stored separate from each other.

In the example shown in FIG. 5 the table 500 comprises a first column 508 entitled "AOI ID"; a second column 510 entitled "Location"; a third column 512 entitled "Size"; a fourth column 514 entitled "Terrain Type"; a fifth column 516 entitled "Elevation"; a sixth column 518 entitled "Features"; and a seventh column 520 entitled "Historical Weather". The "AOI ID" column 508 comprises entries 522 such as a unique identifier that uniquely identifying each AOI and its profile in the table 500. The "Location" column 510 comprises entries 524 with data identifying the location of the AOI associated with the AOI profile. One example of location data includes a range of longitude and latitude coordinates defining the area encompassed by the AOI. The "Size" 512 column comprises entries 526 indicating the geographical size of the AOI. The "Terrain Type" column 514 comprises entries 528 indicating the type of terrain associated with AOI. For example, the entries may indicate the terrain type as "Hill", "Desert", "Mountain", "Open", etc. The "Elevation" column 516 comprises entries 530 indicating the elevation of the AOI.

The "Features" column 518 comprises entries 532 identifying geographical features and (optionally) their locations within the AOI. For example, a feature entry under this column may indicate the AOI has a river/stream, mountain, cluster of trees, boulders, and/or the like at specific locations within the AOI. In another example, a feature entry may indicate that the ground within the AOI is comprised of gravel, grass, cement, and/or the like. The "Historical Weather" column 520 comprises entries 534 having historical weather data such as weather patterns for the AOI. For example, the entries under this column may indicate the daily, weekly, monthly, and/or yearly average temperatures, humidity levels, wind speeds, rainfall, snowfall, UV levels, and/or the like.

Monitoring device data 212, 312 for a given monitoring device comprises data such as (but not limited to) device type, sensor data, power source(s), communication capabilities, environmental protection, mobility capabilities, operational range/time(s), operational cost(s), and/or the like. Similar to the AOI data 210, the monitoring device manager 208 may obtain monitoring device data for a given AOI in different ways. For example, the monitoring device manager 208 may utilize one or more of the networking components 206 to establish a communication link with the remote information processing system(s) 104 via the network 112, where the communication link may be secure or unsecure. In this example, the remote information processing system 106 stores monitoring device data 312 for one or more monitoring devices available to the monitoring device manager 208. Upon establishing the communication link, the monitoring device manager 208 may download monitoring device data 312 stored at the remote information processing system 106 and store this data as local data 212 in the one or more storage devices 204. In other embodiments, the monitoring device manager 208 does not download the remotely stored monitoring device data 312, but accesses and processes this data 312 directly on remote information processing system 106. Alternatively, the remote information processing system 106 may push its monitoring device data 312 to the device manager 208 at one or more predefined intervals and/or upon new monitoring device data 312 being obtained by the remote information processing system 106.

FIG. 6 shows various examples of monitoring device data 212. In the example shown in FIG. 6, each row 602, 604, 606 in the table 600 corresponds to monitoring device data for a given set of monitoring devices; an individual monitoring device; and/or monitoring device accessories such as refueling/recharging docking systems and weather protection enclosures. Each row 602, 604, 606 may be referred to herein as an "monitoring device profile". In this example, each column within the table 600 stores a different type of data. It should be noted that embodiments of the present invention are not limited to the types of data shown in the columns of FIG. 6. Also, one or more of the columns shown in FIG. 6 may be removed and/or additional columns having different types of data may be added. It should also be noted that monitoring device profiles for different monitoring devices are not required to be stored in a single table and may be stored separate from each other.

In the example shown in FIG. 6 the table 600 comprises a first column 608 entitled "Device ID"; a second column 610 entitled "Device Type"; a third column 612 entitled "Sensor/Feature Data"; a fourth column 614 entitled "Power Source(s)"; a fifth column 616 entitled "Comm"; a sixth column 618 entitled "Protection"; a seventh column 620 entitled "Mobility"; an eighth column 622 entitled "Op Features"; a ninth column 624 entitled "Op Time"; and a tenth column 626 entitled "Op Costs". The "Device ID" column 608 comprises entries 628 comprise a unique identifier for the device associated with the monitoring device profile. It should be noted that in some embodiments, each row in the table is a monitoring device profile for a group of identical devices such as a given product. For example, a monitoring device profile may represent a given product such as a specific UAV model. In this embodiment, the identifier uniquely identifies the product as a whole. In other embodiments, a monitoring device profile represents an individual device where multiple identical device each of their own monitoring device profile. In this embodiment, the identifier uniquely identifies the individual device.

The "Device Type" column 610 comprises entries 630 indicating the device type of the monitoring device(s) associated with the device profile. Examples of device types include (but are not limited to) UAV, rover, climbing robot, camera, and/or the like. The "Sensor/Feature Data" column 612 comprises entries 632 identifying and/or describing the sensors/features that are implemented on the monitoring device(s). For example, these entries may indicate whether the device(s) has a GPS system; accelerometer; a barometer; a weather sensor; an optical imaging system for capturing photographs and/or video; the type of image sensor utilized by the system (e.g., visible light sensor, infrared sensor, etc.); the resolution of the system; focal length of lens; zoom capabilities; and/or the like. The sensor data entries may also indicate if the device has a thermal sensor; ion sensor; plasma sensor; audio sensor; and/or the like, and further identify the operating capabilities of these sensors.

The "Power Source(s)" column 614 comprises entries 634 identifying the types of power sources utilized by the device and their operating characteristics. For example, a power source entry may indicate that the monitoring device comprises a rechargeable or disposable (non-chargeable) battery; number of batteries; whether a rechargeable may be charged using solar or non-solar mechanisms; battery chemistry; battery voltage; battery capacity; battery power; and/or the like. The "Communication" column 616 comprises entries 636 identifying the communication capabilities of the device. For example, a communication entry may indicate whether the device has wired and/or wireless communication abilities; the communication standards/networks supported by the device; security protocols implemented by the device; and/or the like.

The "Protection" column 618 comprises entries 638 indicating the type of environmental protection that is utilized by the device. For example, these entries may indicate the International Protection (IP) Marking code of the device; degree of protection against electromagnetic pulses; degree of protection against drops, bumps, and falls; and/or the like. The "Mobility" column 620 comprises entries 640 indicating the mobility capabilities of the device. For example, a mobility entry may indicate whether the device is fixed or mobile; identify a mobility modality such as flight, ground traversal, climbing, and/or the like; if the device is a camera whether it can be panned and/or tilted; and/or the like.

The "Operating Features" column 622 comprises entries 642 indicating specific features of the device. For example, an operating feature entry may identify the roving, flight, or climbing speed of the device; the number of wheels or propellers; the altitude limit of the device; whether the device has a return to base feature when batter levels are low; and/or the like. The "Op Time/Range" column 624 comprises entries 644 indicating the operating time and/or range of each device of the device before recharging or refueling is needed. The "Op Costs" column 626 comprises entries 646 indicating the costs associated with operating the device. For example, these entries may indicate the purchase cost of the device; prices for replacement parts; average cost to operate the device on a daily, monthly, and/or yearly basis; and/or the like. The average operating cost may take into consideration factors such as expected repairs or parts replacement, fuel or electricity costs, and/or the like. In some embodiments, the device manager 208 may calculate the average operating cost for a device base on the data stored in the device profile.

System component data 214, 314 comprises data such as (but not limited to) a unique identifier of the component; part number of the component; location of the component; function of the component; and/or the like. The monitoring device manager 208 may obtain system component data 214 for a given AOI 102 in different ways. For example, the monitoring device manager 208 may utilize one or more of the networking components 206 to establish a communication link with the remote information processing system(s) 104 via the network 112, where the communication link may be secure or unsecure. In this example, the remote information processing system 106 stores system component data 314 for one or more utility systems. Upon establishing the communication link, the monitoring device manager 208 may download the system component data 314 stored at the remote information processing system 106 and store this data as local system component data 214 in one or more storage devices 204. In other embodiments, the monitoring device manager 208 does not download the remotely stored system component data 314, but accesses and processes this data 314 directly on remote information processing system 106. Alternatively, the remote information processing system 106 may push its system component data 314 to the device manager 208 at one or more predefined intervals and/or upon new system component data 314 being obtained by the remote information processing system 106.

In some embodiments, the system component data 314 obtained from the remote information processing system 106 comprises data for all AOIs associated with one or more entities (e.g., utility providers) utilizing the device manager 208. In other embodiments, the device manager 208 obtains the remote system 106 component data 314 on an as needed basis. For example, when the device manager 208 determines an AOI 102 requires placement and management of monitoring/inspection devices the manager 208 only obtains system component data 314 for the specific AOI 102 (and possibly related AOIs as well).

In addition to (or in lieu of) obtaining system component data from the remote information processing system 106, the device manager 208 may obtain system component data 214 from the one or more surveying devices 108. For example, upon determining that an AOI 102 requires placement and management of monitoring/inspection devices the manager 208 may utilize one or more of the networking components 206 to establish a communication link with a surveying device 108 via the network 112, where the communication link may be secure or unsecure. The surveying device 108 utilizes these components to obtain system component data such as component location data, component type data, and/or the like. Once this data is obtained, the surveying device 108 may transmit this data to the device manager 208 as system component data 214 over a communication link established with device manager 208 via the network 112. In some embodiments, the system component data received from the surveying device 108 may comprise photographs and/or videos of the surveyed area. In these embodiments, the device manager 208 is configured to analyze the photographs and/or videos to identify system components within the AOI 102. For example, the device manager 208 may utilize machine learning and feature recognition mechanisms to identify system components, their location, and/or the like.

The device manager 208 may receive the system component data 214 from the surveying device 108 in real time as the surveying device 108 captures the data and/or at given intervals. In some embodiments, the device manager 208 requests the system component data 214 from the surveying device 108 in response to receiving a request to perform one or more monitoring device preplacement operations. Alternatively, the surveying device 108 provides system component data without receiving a request from the device manager 208. In some embodiments, the device manager 208 programs the surveying device 108 with a roving/flight travel path based on AOI location data (e.g., GPS coordinates) so that the surveying device 108 may autonomously traverse the AOI 102 to obtain system component data 214. The device manager 208 may store the system component data 214 received from the surveying device(s) 106 data locally in one or more storage devices 204.

The AOI data 210, 310 and system component data 214, 314 received from the remote information processing system(s) 104 and/or surveying device(s) 106 may be referred to as "surveying data". The device manager 208 may utilize the surveying data to identify system components within an AOI 102; select one or more mobile unmanned monitoring devices from a plurality of mobile unmanned monitoring devices for monitoring/inspecting the system component; determining a placement location within the AOI for implementing the selected mobile unmanned monitoring device(s); determining a travel path within the AOI 102 for the mobile unmanned monitoring device; and/or the like.

FIG. 7 shows various examples of system component data 214. In the example shown in FIG. 5, each row 702, 704, 706 in the table 700 corresponds to system component data for system components located within AOIs, and is referred to herein as an "system component profile". In this example, each column within the table 700 stores a different type of data. It should be noted that embodiments of the present invention are not limited to the types of data shown in the columns of FIG. 5, and one or more columns shown in FIG. 5 may be removed and/or additional columns having different types of data may be added. It should also be noted that system component profiles for different system components are not required to be stored in a single table and may be stored separate from each other. In some embodiments, the system component data 214 may be part of the AOI data 210.

In the example shown in FIG. 7 the table 700 comprises a first column 708 entitled "Component ID"; a second column 710 entitled "AOI"; a third column 712 entitled "Part Number"; a fourth column 714 entitled "Location"; and a fifth column 716 entitled "Function". The "Component ID" column 708 comprises entries 718 that include a unique identifier for the component associated with the system component profile. The identifier may be a serial number or any other identifier that uniquely identifies the system component. The "AOI" column 710 comprises entries 720 with data identifying the AOI where the given system component location resides. The AOI entries may comprise a pointer to the corresponding AOI profile within the AOI data 210 and/or a unique identifier of the AOI. In some embodiments, an AOI profile for a given AOI may comprise an entry having the unique identifiers of the system components residing within the AOI and/or pointers to the corresponding system component profiles.

The "Part Number" column 712 comprises entries 722 indicating the part number/model of the system component. The "Location" column 714 comprises entries 724 identifying the location of the system component within the AOI. For example, location entries may comprise latitude/longitude coordinates of the component; altitude data; and/or the like. The "Function" column 716 comprises entries 726 identifying/describing the functions and features of the component.

Once the device manager 208 obtains AOI data 210 and system component data 214 associated with a given AOI 102 and further obtains monitoring device data 212, the device manager 208 determines a set of at least one monitoring device 132 to be placed within the AOI 102 and further determines the locations at which to place the at least one monitoring device 132 based on this data. For example, consider the AOI 400 discussed above with respect to FIG. 4. In this example, the device manager 208 receives a request to perform one or more monitoring device placement operations for the AOI 400. In another example, the monitoring device manager 208 automatically determines when device placement operations should be performed for the AOI 400. For example, the device manager 208 may monitor the AOI data 210 to determine when a new AOI has been added.

In the current example, when the device manager 208 receives a request to perform one or more monitoring device placement operations for the AOI 400 it searches the AOI data 210 and the system component data 214 (if separate from the AOI data 210) to determine if data exists for the AOI 400. If AOI and system component data does not exist for the AOI 400 the device manager 208 obtains the data using one or more mechanisms discussed above. Once the device manager 208 obtains the AOI data 210 and the system component data 214 for the AOI 400 the manager 208 analyzes the data to identify one or more attributes of the AOI 400 and the system components within the AOI 400. For example, the device manager 208 analyzes the AOI data 210 for the AOI 400 to determine its location; geographical size; terrain type; elevation; specific features such as trees, boulders, rivers/streams, etc.; historical weather data; and/or the like.

The device manager 208 also analyzes the system component data 214 for the AOI 400 to identify the system components located within the AOI 400 and their attributes. In this example, the device manager 208 analyzes the system component data 214 for the AOI 400 and determines that the AOI 400 comprises utility poles 402, 404; transmissions lines 406, 408; and a substation 410. The device manager 208 further identifies any subcomponents for each of these main components such as fuse cutouts, surge arrestors, overhead lines, transformers, etc. In addition to components and subcomponents, the device manager 208 determines the location of these items within the AOI 400. For example, the device manager 208 determines that a first utility pole 402 with a given height is located at Location_A 418; a second utility pole with a given height is located at Location_B 420; a first set of transmission lines is located at Location_C 422 to Location_D 424; a second set of transmission lines is located at location Location_E 426 to Location_F 428; a substation 410 of having a given area is located at Location_G 430; and substations components 432 such as a transformer are located at various locations within the substation 410 such as Location_H 434 within the substation; etc.

The device manager 208 analyzes the monitoring device data 212 based on the attributes of the AOI 400 and system components 402 to 410 to determine a set of monitoring devices (e.g., devices 132 to 140) to be placed within the AOI 400 and a set of locations at which to place these devices. For example, the device manager 208 identifies attributes associated with available monitoring devices such as their device type; sensors and features; power sources; communication abilities; protection features; mobility features; operating features; operating range/time; operation costs; and/or the like. The device manager 208 analyzes this device data to determine a set of monitoring devices that are applicable to the AOI 400 and its system components 402 to 410 for the type of monitoring to be performed.

For example, the device manager 208 may determine from the AOI data 210 that the AOI 400 comprises rocky terrain and geographical features 412, 414, 416 such as boulders, where a rover-based monitoring device may not be best suited for the AOI 400. In another example, the device manager 208 may determine from the AOI data 210 that the AOI 400 experiences heavy winds such that a UAV device may not be best suited for the AOI 400. In addition, the device manager 208 may determine from the system component data 214 that a transformer is located 208 ft above ground. Therefore, the device manager 208 needs to identify a monitoring device that is able to monitor a device at that height.

For example, based on the monitoring device data 212, the device manager 208 may identify a subset of cameras that have a lens that allows the cameras to be placed a ground level and still provide up-close high-resolution images of the transformer. The device manager 208 may also identify cameras that may be placed at a location on the utility pole near the transformer. The device manager 208 may not only identify cameras that may suitable for monitoring the transformer but may also identify UAVs, climbing robots, or other monitoring devices as well. When multiple devices and/or device types are determined to be suitable for placement within the AOI 400 for monitoring of a system component(s) the device manager 208 may utilize monitoring device data 212 such as device operating range/time, device operating costs, device replacement/repair costs, historical monitoring performance data for the devices; type of monitoring to be performed, preferences provided by the utility provider; and/or the like to select one or more of the suitable monitoring devices.

The device manager 208 not only determines a set of monitoring devices from a plurality of monitoring devices that are to be placed within the AOI 400, but also determines the locations at which these devices are to be placed. The device manager 208 may determine device placement locations based on a number of different factors. In one embodiment, the device manager 208 may utilize the AOI data 210 and system component data 214 to identify any geographic features that may obstruct the operation of the selected monitoring devices. For example, consider the AOI 400 shown in FIG. 4. The device manager 208 determines from the AOI data 210 that geographical feature 416 (e.g. a cluster of trees) is located at Location_I 436. The device manager 208 further determines from the system component data 214 that the substation 410 is located at Location_G 430. The device manager 208 utilizes this data to where to position the selected monitoring device (e.g., a fixed camera) such that it has an unobstructed view of the substation 410.

In another example, the selected monitoring device(s) may be a mobile device such as a UAV or a rover. In this example, the device manager 208 may utilize the AOI data 210 to identify locations and type geographical features; the monitoring device data 212 to determine device power source and operating range/time; and the system component data 214 to determine the locations of the system components to be monitored. The device manager 208 may utilize this data to determine the number of monitoring devices to be placed within the AOI and the locations at which to place the devices. For example, consider the AOI 400 shown in FIG. 4. The device manager 208 may determine that three of the selected monitoring devices (e.g., UAVs) are to be disposed at three different locations based on the size of the area to be monitored, the operating range/time of the devices, and/or the like. In this example, the determined locations ensure that all areas/components are able to be monitored.

The device manager 208 may configured to utilize one or more mechanisms to determine the set of monitoring devices and their placement locations within an AOI based on the AOI data 210, monitoring device data 212, and system component data 214. In one embodiment, the device manager 208 may utilize a set of rules 220 to determine the set of monitoring devices and their placement locations within an AOI. For example, the rules 220 can specify the type of monitoring devices that are to be utilized for a given AOI; the type of monitoring devices to be utilized based on the location and altitude of the component to be monitored; the features and/or sensors required to monitor a type of system component; the features and/or sensors required to monitor for a given problem type and/or operational characteristic; whether monitoring/inspection is to be continuous or can be performed at given intervals or time; operational cost requirements; device communication abilities; and/or the like. It should be noted that embodiments of the present invention are not limited to these rules, and other rules may be applicable as well.

In one embodiment, the device manager 208 applies the placement rules 220 to the AOI data 210, monitoring device data 212, and system component data 214 and determines a set of monitoring devices that satisfies the criteria defined in the rules. For example, consider a rule states that for region Reg_A in the United States UAVs are to be utilized for inspecting transmissions lines and the operational cost per year is be less than or equal to Y. In this example, the device manager 208 determines what region of the United States the AOI 400 is in based on AOI profile within the AOI data 210. The device manager 208 further determines the locations and height of the transmissions lines to be monitored within the AOI 400 based on the system component data 214. The manager 208 then analyzes the monitoring device data 212 to identify UAV monitoring devices and their attributes such as operating ranges/times and operational costs. The device manager 208 may then select one or more of the identified UAVs based on their operating ranges/times and operational costs and the conditions defined in the rule.

In some embodiments, the device manager 208 may assign weights or a score during the monitoring device selection process to the attributes associated with a monitoring device based on their compliance or satisfaction of rule requirements/conditions. For example, consider a rule that requires a device type of "UAV". If the attributes of a given monitoring device being analyzed indicate that monitoring device has a device type of "Rover" then the device manager 208 assigns a weight/value such as 0 out of 5. However, if the monitor device has a device type of "UAV" then the device manager 208 may assign a weight/value of 5 out of 5. In this example, a lower weight/value indicates a lesser degree of compliance or satisfaction of a rule requirement/condition, where a higher weight/value indicates a higher degree of compliance or satisfaction of a rule requirement/condition. After analyzing the monitoring device data 124 for the available monitoring devices and assigning a weight/score to their attributes, the device manager 208 may utilize the scores of each monitoring device to select the devices that best satisfy the requirement/conditions of the rule(s).

In some embodiments, the device manager 208 may utilize machine/computer learning to determine a set of monitoring devices and their placement locations within an AOI based on the AOI data 210, monitoring device data 212, and system component data 214. In one embodiment, the device placement algorithm/model is trained using one or more machine learning techniques. For example, in one embodiment, the device placement algorithm/model is a deep learning artificial neural network (DLANN) model trained to determine a set of monitoring devices and their placement locations within an AOI based on the AOI data 210, monitoring device data 212, and system component data 214. However, other machine learning models are applicable as well.

A DLANN model is generally comprised of a plurality of connected units referred to as artificial neurons. Each unit is able to transmit a signal to another unit via a connection there between. A unit that receives a signal from another unit processes the signal and may transmit its own signal to another unit based on the processed signal. A unit may be associated with a state (e.g., $0 \leq x \leq 1$) where both a unit and a connection may be associated with a weight that affects the strength of the signal transmitted to another unit. The weight may vary during the learning process of the model. The model may comprise multiple layers of connected units, where different layers perform different transformations on their inputs. The first layer acts as the initial input (e.g., from the inputted data) to the model, where signals from this layer propagate to the final layer (e.g., identified solution). The initial layers of the model may detect specific characteristics of the target solution while inner layers may detect more abstract characteristics based on the output of the initial layers. The final layers may then perform more a complex detection based on the output inner layers to detect the target solution.

The DLANN model utilized by the device manager 208, in one embodiment, is trained by providing training data to the model as an input. The model may be trained at the device manager 208 and/or at an external information processing system. In one embodiment, the training data comprises historical AOI data, historical system component data, and historical monitoring device placement data. The historical AOI and system component data is similar to the AOI data 210 and system component data 214 discussed above. The historical monitoring device placement data identifies monitoring devices placed within specific AOIs and their locations, and further comprises attribute data of the monitoring devices similar to the monitoring device data 212 discussed above. As the DLANN model is trained with historical AOI data, historical system component data, and monitoring device placement data it learns which monitoring devices should be selected for a given AOI based on the attributes of the monitoring devices, the AOI, and the system components to be monitored by the devices.

Once the device manager 208 has determined a set of monitoring devices and their placement locations within an AOI the device manager 208 may store this data in a local and/or remote storage device as device placement data 216. In some embodiments, the device manager 208 may transmit the placement data 216 to one or more electronic devices such as the remote information processing system 106, user devices 110, and/or the like. This data 216 may then be utilized to place the selected monitoring devices 132 to 140 at their appropriate locations within the AOI.

In some embodiments, the device manager 208 may utilize one or more of the above operations to determine where recharging/refueling docking systems, weather protection enclosures, and/or the like may be placed within the AOI 102. For example, based on the AOI data 210, device data 212, and/or the system component data 214 the device manager 208 may determine one or more recharging stations to be placed at a given location(s) within an AOI 102 for a selected drone. The device manager 208 may determine which of a plurality of recharging stations to select based on its attributes/features stored within the device data 212 and attributes/features of the selected drone. For example, the device manager 208 may determine that the selected drone has a flight time of 30 minutes and will need to traverse a given flight path based on its determined placement location and location of the system components to be monitored. The device manager 208 may utilize this information to determine the number of recharging stations, the types of recharging stations to be implements; the placement locations of the recharging stations within the AOI 102, and/or the like.

It should be noted that the utilization of recharging/refueling stations, weather protections enclosures, and/or the like may be considered by the device manager 208 when determining monitoring devices to place within the AOI 102. For example, the device manager 208 may determine that operations costs will be lessened if lower number of mobile unmanned aerial monitoring devices are utilized with one or more recharging stations that if a greater number of mobile unmanned aerial monitoring devices are utilized without recharging stations.

FIG. 8 shows one example of placement data 216. In the example shown in FIG. 8, each row 802, 804, 806 in the table 800 corresponds to placement data for an individual monitoring device placed within an AOI 102. It should be noted that embodiments of the present invention are not limited to the types of data shown in the columns of FIG. 8, and one or more columns shown in FIG. 8 may be removed and/or additional columns having different types of data may be added. It should also be noted that placement data for different monitoring devices is not required to be stored in a single table and may be stored separate from each other. In some embodiments, the system component data 214 may be part of the AOI data 210 and/or the device data 212.

In the example shown in FIG. 8 the table 800 comprises a first column 808 entitled "Device ID"; a second column 810 entitled "AOI"; a third column 812 entitled "Comp ID"; and a fourth column 814 entitled "Location". The "Device ID" column 808 comprises entries 816 having a pointer to the device profile of the monitoring devices within the device data 212. In another embodiment, these entries 816 comprise the unique identifier of the device. The "AOI" column 810 comprises entries 818 having a pointer to the AOI profile of within the AOI data 210 corresponding to the AOI in which the monitoring device was placed. In another embodiment, these entries 818 comprise the unique identifier of the AOI. The "Comp ID" column 812 comprises entries 820 having a pointer to the system component(s) profile within the system component data 214 being monitored by the monitoring device. In another embodiment, these entries 820 comprise the unique identifier of the system components. The "Location" column 814 comprises entries 822 identifying the location, height, and/or the like at which the monitoring device was placed within the AOI.

Figure 9:
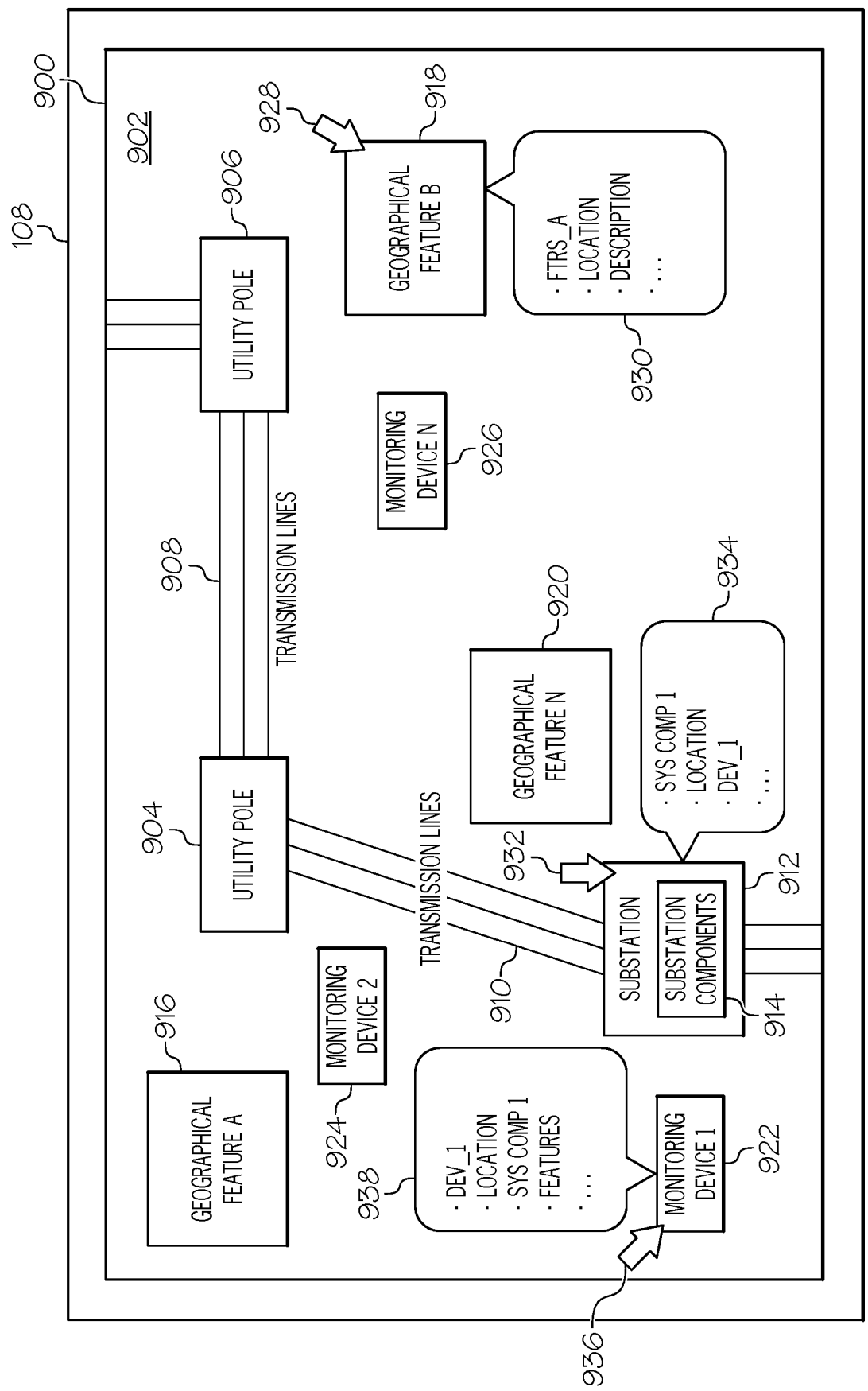
FIG. 9 is an illustrative example of an interactive map representing an area of interest and monitoring devices for monitoring/inspecting system components within the area of interest according to one embodiment of the present invention.

The device manager 208 may also generate an interactive map 218 of a given AOI for which device placement operations have been performed. FIG. 9 shows one example of an interactive map 900 corresponding to the AOI 400 of FIG. 4 being displayed on a user interface 902 of a user device 110. In this example, the interactive map 900 comprises icons/widgets 904 to 920 representing the AOI 400; system components 402 to 410; geographical features 412, 414, 416; and system subcomponents 432. The interactive map 218 also comprises icons/widgets 922, 924, 926 representing the monitoring devices to be placed or that have been placed within the AOI 400 based on the operations discussed above. The device manager 208 generates and configures the icons/widgets or images representing these components to be selectable by a user.

For example, FIG. 9 shows that when a user selects a geographical widget 918, as represented by the arrow 928, the device manager 208 may configure the interactive map 900 to display information 930 such as the location of the topographical feature within the AOI 400; a type and description of the topographical feature; and/or the like. FIG. 9 also shows that when a system component widget 912 is selected, as represented by the arrow 934, the device manager 208 may configure the interactive map 900 to display information such as the component identifier; component location; component description; identifier and type of monitoring device monitoring the component; and/or the like. FIG. 9 further shows that when a monitoring device widget 922 is selected, as represented by the arrow 936, the device manager 208 may configure the interactive map 900 to display information 938 such as the unique identifier of the monitoring device; location of the monitoring device within the AOI 400; feature description; sensor description; monitoring operations to be performed by the AOI; and/or the like.

The device manager 208 may also configure the interactive map 900 to display monitoring device configuration information such as flight/roving paths, image resolution, pan/tilt parameters, and/or the like when a given monitoring device is selected or another option is selected within the interactive map 900. In addition, the device manager 208 may also provide real-time or near real-time operational data of a monitoring device to a user through the interactive map 900. For example, a user is able to select a widget being presented within the interactive map 900 representing a monitoring device or a system component. The device manager 208 receives at least an identifier associated with the selected widget and compares this identifier with the AOI data 210, device data 212, system component data 214, and/or the placement data 216 to identify the corresponding monitoring device and/or system component. The device manager 208 then establishes a communication link with the monitoring device associated with the selected widget through the network 112. The monitoring device may then transmit monitoring data such as (but not limited to) images, video stream, temperature readings, and/or the like to the monitoring device 208. The device manager 208 may then present this monitoring data to the user via the interactive map 900.

In some embodiments, the device manager 208 may be configured to program one or more of the monitoring devices 132 to 140 to perform their monitoring/inspection operations. The device manager 208 may utilize one or more mechanisms such as monitoring/inspection rules or specifications; machine learning and/or the like to determine how a monitoring device is to be programmed. In one embodiment, the device manager 208 may utilize one or more of the networking components 206 to establish a communication link with a monitoring device 132 via the network 112, where the communication link may be secure or unsecure. The device manager 208 may then program to the monitoring device 132 to perform one or more monitoring/inspection operations. For example, the device manager 208 may program a UAV with a specific flight path for monitoring a given utility system component.

Figure 10:
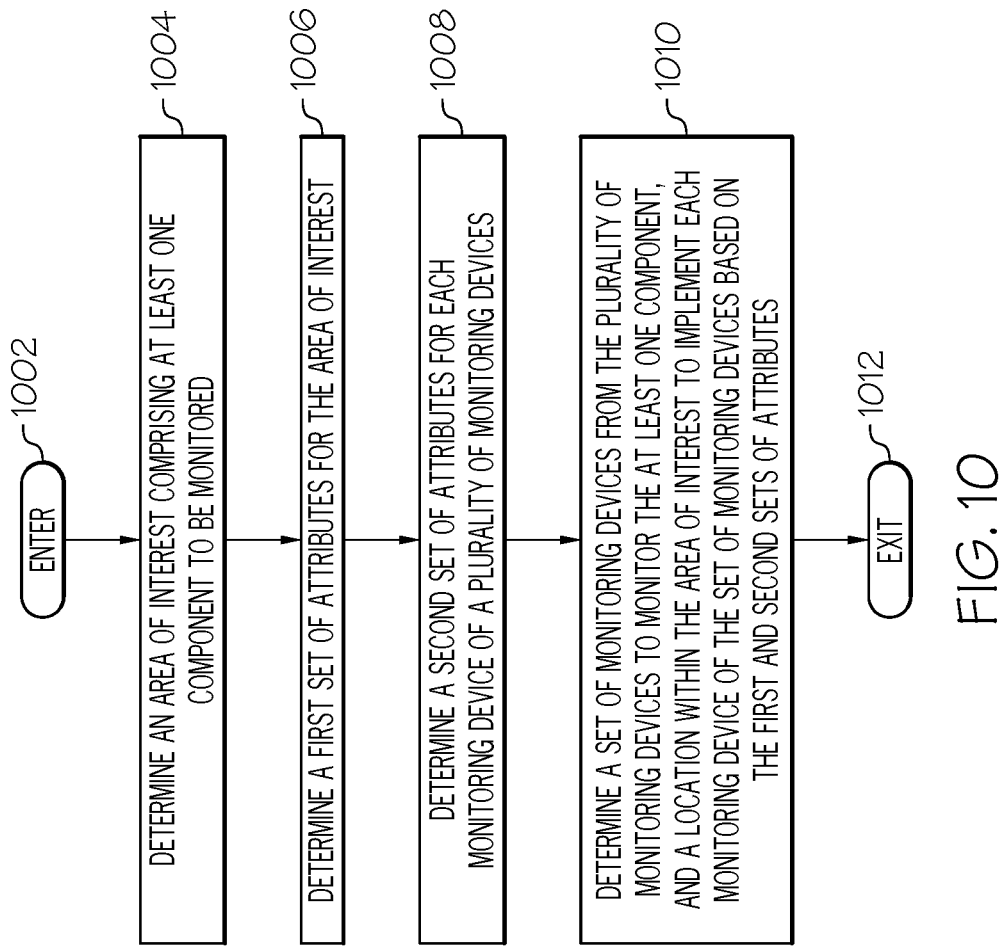
FIG. 10 is an operational flow diagram illustrating one example of autonomous management of monitoring/inspection devices within areas of interest according to one embodiment of the present invention.

FIG. 10 is an operational flow diagram illustrating one example of managing devices for autonomous monitoring of components within at least one area of interest. The operational flow diagram of FIG. 10 begins at step 1002 and flows directly to step 1004. The monitoring device manager 208, at step 1004, determines an area of interest comprising at least one component to be monitored. The monitoring device manager 208, at step 1006, determines a first set of attributes for the area of interest, monitoring device manager 208, at step 1008, determines a second set of attributes for each monitoring device of a plurality of monitoring devices. The monitoring device manager 208, at step 1010, determines a set of monitoring devices from the plurality of monitoring devices to monitor the at least one component, and a location within the area of interest to implement each monitoring device of the set of monitoring devices based on the first and second sets of attributes. The control flow exits at step 1012.

Figure 11:
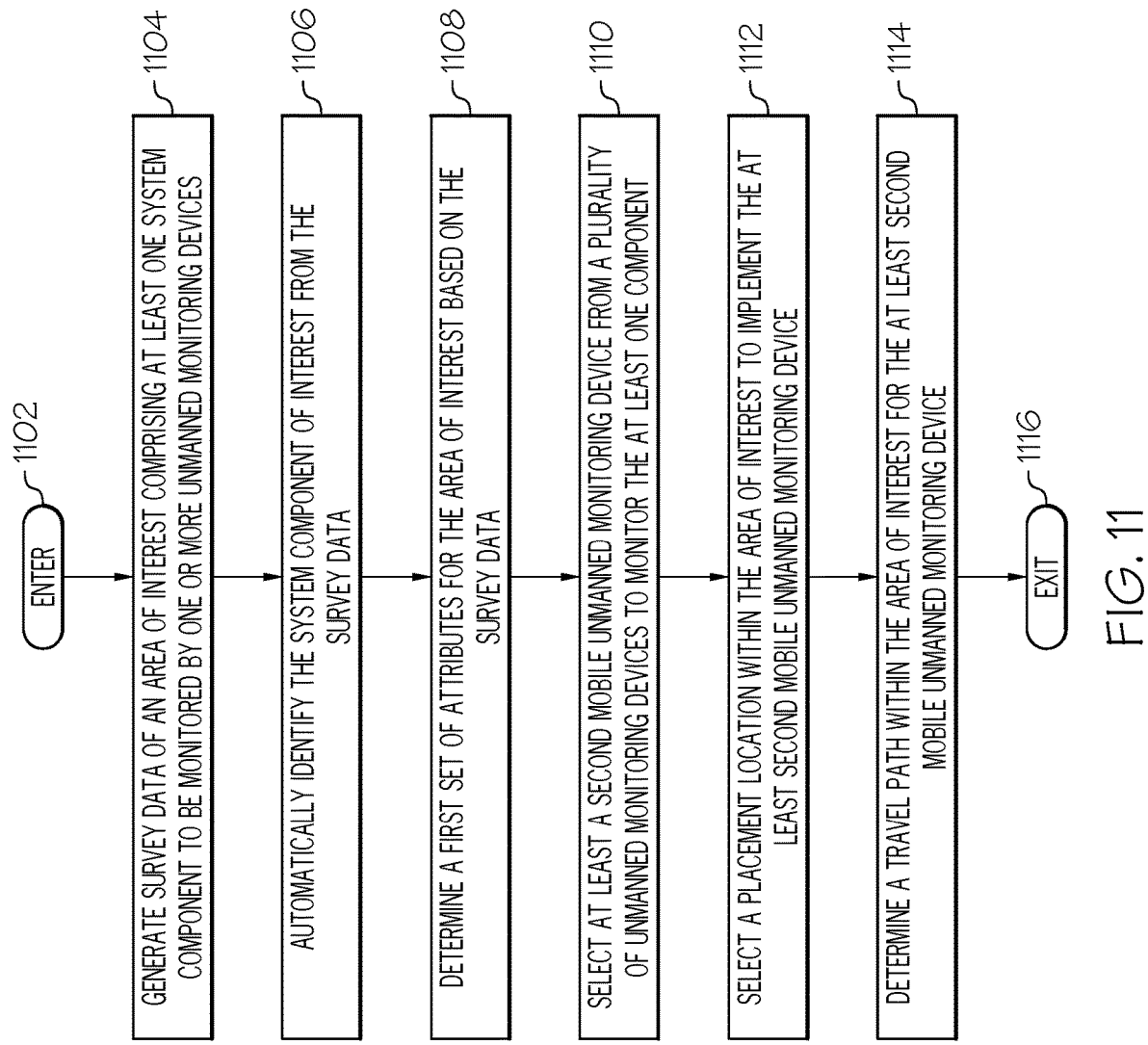
FIG. 11 is an operational flow diagram illustrating another example of autonomous management of monitoring/inspection devices within areas of interest according to one embodiment of the present invention.

FIG. 11 is an operational flow diagram illustrating one example of managing devices for autonomous monitoring of components within at least one area of interest. The operational flow diagram of FIG. 11 begins at step 1102 and flows directly to step 1104. The monitoring device manager 208, at step 1104, generates survey data of an area of interest comprising at least one system component to be monitored by one or more unmanned monitoring devices. In one embodiment, the device manager 208 utilizes at least a first mobile unmanned monitoring device to generate the survey data. The device manager 208, at step 1106, automatically identifies the system component of interest from the survey data.

The device manager 208, at step 1108, determines a first set of attributes for the area of interest based on the survey data. The device manager 208, at step 1110, selects at least a second mobile unmanned monitoring device from a plurality of unmanned monitoring devices to monitor the at least one component based on at least the first set of attributes a second set of attributes for each mobile unmanned monitoring device of the plurality of mobile unmanned monitoring devices. The device manager 208, at step 1112, selects a placement location within the area of interest to implement the at least second mobile unmanned monitoring device based on at least the first set of attributes and the second set of attributes associated with the at least second mobile unmanned monitoring device. The device manager 208, at step 1114, further determines a travel path within the area of interest for the at least second mobile unmanned monitoring device based on at least the first set of attributes and the second set of attributes associated with the at least second mobile unmanned monitoring device. The control flow exits at step 1116.

Figure 12:
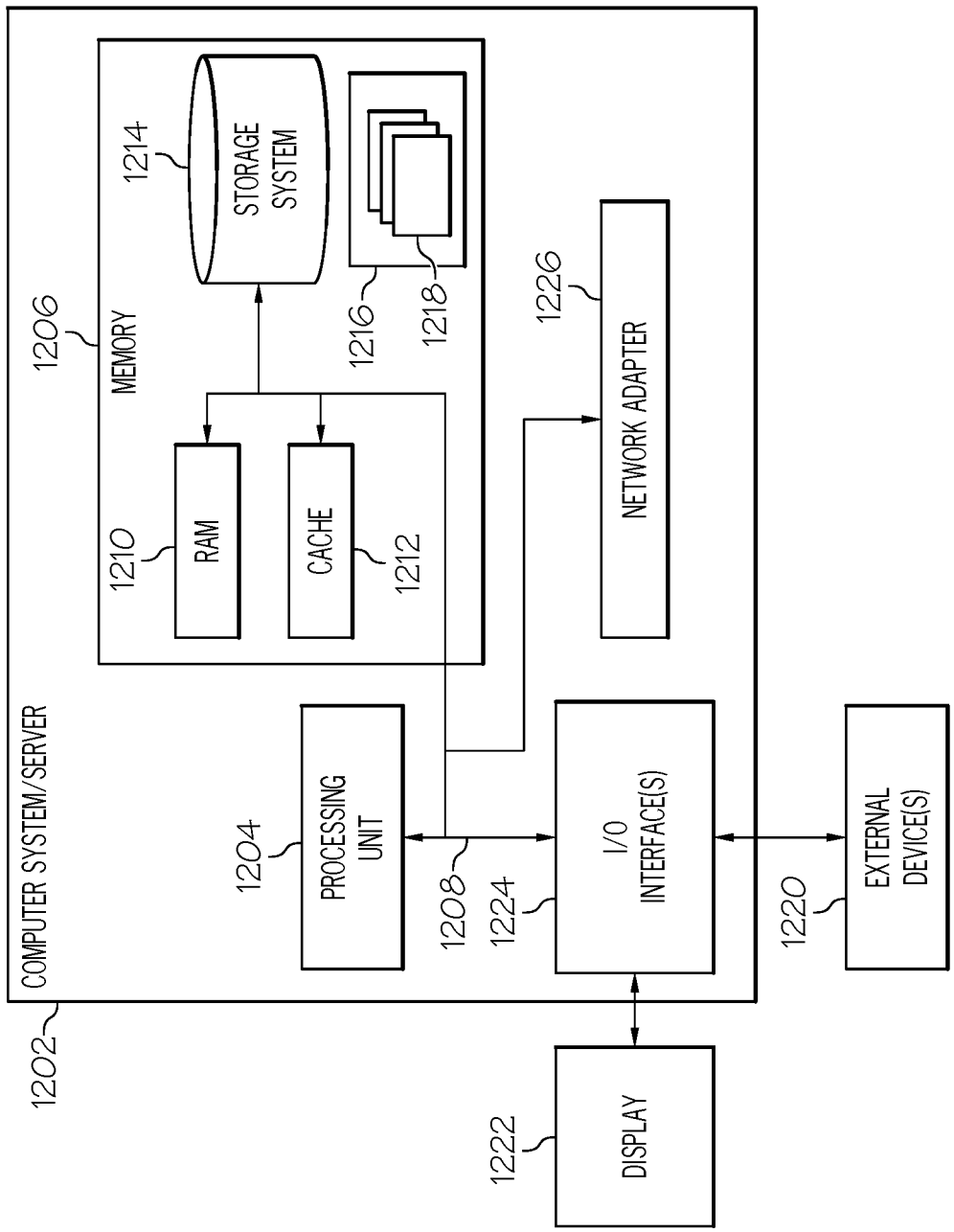
FIG. 12 is a block diagram illustrating another example of an information processing system according to one embodiment of the present invention.

Referring now to FIG. 12, this figure is a block diagram illustrating an information processing system that can be utilized in embodiments of the present invention. The information processing system 1202 is based upon a suitably configured processing system configured to implement one or more embodiments of the present invention such as the monitoring device manager 208 of FIG. 2. The components of the information processing system 1202 can include, but are not limited to, one or more processors or processing units 1204, a system memory 1206, and a bus 1208, which couples various system components including the system memory 1206 to the processor 1204. The bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1206 may include computer system readable media in the form of volatile memory, such as random access memory (RAM) 1210 and/or cache memory 1212. The information processing system 1202 can further include other removable/non-removable, volatile/non-volatile computer system storage media. By way of example only, a storage system 1214 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1208 by one or more data media interfaces. The memory 1206 can include at least one program product having a set of program modules that are configured to carry out the functions of an embodiment of the present invention.

Program/utility 1216, having a set of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of embodiments of the present invention.

The information processing system 1202 can also communicate with one or more external devices 1220 such as a keyboard, a pointing device, a display 1222, etc.; one or more devices that enable a user to interact with the information processing system 1202; and/or any devices (e.g., network card, modem, etc.) that enable computer system/server 1202 to communicate with one or more other computing devices. Such communication can occur via I/O interfaces 1224. Still yet, the information processing system 1202 can communicate with one or more networks such as a local area network (LAN), a general wide area network (WAN), and/or a public network (e.g., the Internet) via network adapter 1226. As depicted, the network adapter 1226 communicates with the other components of information processing system 1202 via the bus 1208. Other hardware and/or software components can also be used in conjunction with the information processing system 1202. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by an information processing system, of managing devices for autonomous monitoring of components within at least one area of interest, the method comprising:
generating, utilizing at least a first mobile unmanned monitoring device, survey data of an area of interest comprising at least one system component to be monitored by one or more mobile unmanned monitoring devices;
automatically identifying at least one system component of interest from the survey data;
determining a first set of attributes of the area of interest based on the survey data, the first set of attributes comprising at least one of environmental attributes or geographical attributes of the area of interest;
selecting at least a second mobile unmanned monitoring device from a plurality of mobile unmanned monitoring devices to monitor the at least one system component based on at least the first set of attributes a second set of attributes of each mobile unmanned monitoring device of the plurality of mobile unmanned monitoring devices, the second set of attributes comprising at least one or more operating attributes of the mobile unmanned monitoring device;
selecting a placement location within the area of interest to implement the at least second mobile unmanned monitoring device based on at least the first set of attributes and the second set of attributes; and
determining a travel path within the area of interest for the at least second mobile unmanned monitoring device based on at least the first set of attributes and the second set of attributes.

2. The method of claim 1, further comprising:
determining a third set of attributes for the at least one system component, wherein selecting the at least a second mobile unmanned monitoring device is further based on the third set of attributes.

3. The method of claim 1, wherein the first set of attributes comprises one or more of at least:
geographical size of the at least one area of interest;
location of the at least one area of interest;
terrain type of the of the at least one area of interest;
elevation of the at least one area of interest;
geographical features of the at least one area of interest; and
historical weather patterns of the at least one area of interest.

4. The method of claim 1, wherein the second set of attributes comprises one or more of at least:
device type of the mobile unmanned monitoring device;
features of the mobile unmanned monitoring device;
sensors of the mobile unmanned monitoring device;
power sources of the mobile unmanned monitoring device;
communication abilities of the mobile unmanned monitoring device;

mobility capabilities of the mobile unmanned monitoring device;
operational range of the mobile unmanned monitoring device;
operational time of the mobile unmanned monitoring device; and
operational cost of the mobile unmanned monitoring device.

5. The method of claim 1, further comprising:
programming the at least second mobile unmanned monitoring device with one or more monitoring parameters.

6. The method of claim 1, further comprising:
generating an interactive representation of the area of interest comprising a plurality of interactive widgets representing at least the one system component and the at least second mobile unmanned monitoring device; and
presenting, within the interaction representation, information associated with one or more of the at least the one system component or the at least second mobile unmanned monitoring device in response to a corresponding one of the plurality of interactive widgets being selected.

7. The method of claim 1, wherein the area of interest is a geographical area comprising at least one of a power generation system or a power distribution system.

8. An information processing system for managing devices for autonomous monitoring of components within at least one area of interest, the information processing system comprising:
a processor;
memory communicatively coupled to the processor; and
a monitoring device manager communicatively coupled to the processor and the memory that, when operating, is configured to:
generate, utilizing at least a first aerial unmanned monitoring device, survey data of an area of interest comprising at least one system component to be monitored by one or more mobile unmanned monitoring devices;
automatically identify at least one system component of interest from the survey data;
determining a first set of attributes of the area of interest based on the survey data;
select at least a second mobile unmanned monitoring device from a plurality of unmanned monitoring devices to monitor the at least one system component based on at least the first set of attributes and a second set of attributes of each mobile unmanned monitoring device of the plurality of mobile unmanned monitoring devices,
wherein the at least second mobile unmanned monitoring device is an unmanned land-based rover; and
select a placement location within the area of interest to implement the at least second mobile unmanned monitoring device based on at least the first set of attributes and the second set of attributes associated with the at least second mobile unmanned monitoring device.

9. The information processing system of claim 8, wherein the monitoring device manager is further configured to:
determine a third set of attributes for the at least one system component, wherein selecting the at least a second mobile unmanned monitoring device is further based on the third set of attributes.

10. The information processing system of claim 8, wherein the first set of attributes comprises one or more of at least:
geographical size of the at least one area of interest;
location of the at least one area of interest;
terrain type of the of the at least one area of interest;
elevation of the at least one area of interest;
geographical features of the at least one area of interest; and
historical weather patterns of the at least one area of interest.

11. The information processing system of claim 8, wherein the second set of attributes comprises one or more of at least:
device type of the mobile unmanned monitoring device;
features of the mobile unmanned monitoring device;
sensors of the mobile unmanned monitoring device;
power sources of the mobile unmanned monitoring device;
communication abilities of the mobile unmanned monitoring device;
mobility capabilities of the mobile unmanned monitoring device;
operational range of the mobile unmanned monitoring device;
operational time of the mobile unmanned monitoring device; and
operational cost of the mobile unmanned monitoring device.

12. The information processing system of claim 8, wherein the monitoring device manager is further configured to:
program the at least second mobile unmanned monitoring device with one or more monitoring parameters.

13. The information processing system of claim 8, wherein the monitoring device manager is further configured to:
generate an interactive representation of the area of interest comprising a plurality of interactive widgets representing at least the one system component and the at least second mobile unmanned monitoring device; and
present, within the interaction representation, information associated with one or more of the at least the one system component or the at least second mobile unmanned monitoring device in response to a corresponding one of the plurality of interactive widgets being selected.

14. A computer program product for managing devices for autonomous monitoring of components within at least one area of interest, the computer program product comprising:
a non-transitory computer readable storage medium having computer readable program code embodied therewith, the computer readable program code comprising instructions for:
generating, utilizing at least a first mobile unmanned monitoring device, survey data of an area of interest comprising at least one system component to be monitored by one or more mobile unmanned monitoring devices;
automatically identifying at least one system component of interest from the survey data;
determining a first set of attributes of the area of interest based on the survey data, the first set of attributes comprising at least one of environmental attributes or geographical attributes of the area of interest;
selecting at least a second mobile unmanned monitoring device from a plurality of unmanned monitoring devices to monitor the at least one system component based on at least the first set of attributes a second set of attributes of each mobile unmanned monitoring device of the plurality of mobile unmanned monitoring devices, the second set of attributes comprising at least one or more operating attributes of the mobile unmanned monitoring device, wherein the at least second mobile unmanned monitoring device is selected over another one of the plurality of mobile unmanned monitoring devices based on determining the one or more operating attributes indicate the at least second mobile unmanned monitoring device is operable within the area of interest given the at least one of environmental attributes or geographical attributes of the area of interest; and determining a travel path within the area of interest for the at least second mobile unmanned monitoring device based on at least the first set of attributes and the second set of attributes.

15. The computer program product of claim 14, wherein the computer readable program code further comprises instructions for:

determining a third set of attributes for the at least one system component, wherein selecting the at least a second mobile unmanned monitoring device is further based on the third set of attributes.

16. The computer program product of claim 14, wherein the first set of attributes comprises one or more of at least:

geographical size of the at least one area of interest;
location of the at least one area of interest;
terrain type of the of the at least one area of interest;
elevation of the at least one area of interest;
geographical features of the at least one area of interest; and
historical weather patterns of the at least one area of interest.

17. The computer program product of claim 14, wherein the second set of attributes comprises one or more of at least:

device type of the mobile unmanned monitoring device;
features of the mobile unmanned monitoring device;
sensors of the mobile unmanned monitoring device;
power sources of the mobile unmanned monitoring device;
communication abilities of the mobile unmanned monitoring device;
mobility capabilities of the mobile unmanned monitoring device;
operational range of the mobile unmanned monitoring device;
operational time of the mobile unmanned monitoring device; and
operational cost of the mobile unmanned monitoring device.

18. The computer program product of claim 14, wherein the computer readable program code further comprises instructions for:

programming the at least second mobile unmanned monitoring device with one or more monitoring parameters.

19. The computer program product of claim 14, wherein the computer readable program code further comprises instructions for:

generating an interactive representation of the area of interest comprising a plurality of interactive widgets representing at least the one system component and the at least second mobile unmanned monitoring device; and presenting, within the interaction representation, information associated with one or more of the at least the one system component or the at least second mobile unmanned monitoring device in response to a corresponding one of the plurality of interactive widgets being selected.

20. The computer program product of claim 14, wherein the area of interest is a geographical area comprising at least one of a power generation system or a power distribution system.

\* \* \* \* \*